Patented Mar. 11, 1952

2,589,196

UNITED STATES PATENT OFFICE 2,589,196

MIXTURE OF SURFACE-ACTIVE MATERIALS AND METHOD OF MAKING SAME

Louis T. Monson, Alhambra, Calif., assignor to Petrolite Corporation, Ltd., Wilmington, Del., a corporation of Delaware No Drawing. Original application June 2, 1948, Serial No. 30,726. Divided and this application June 8, 1949, Serial No. 97,932

7 Claims. (Cl. 260—19)

1

This invention relates to new chemical products or compositions of matter and to the manufacture of the same, my present application being a division of my copending application Serial No. 30,726, filed June 2, 1948, and now abandoned.

One object of my invention is to provide new chemical products or compositions that are particularly adapted for breaking or resolving petroleum emulsions and also capable of various other uses as hereinafter described.

Another object of my invention is to provide a practical method of making said chemical products or compositions.

The product or composition of matter herein included in a mechanical mixture of three different types or classes of chemical compounds or products, and preferably includes also a suitable solvent to give the mixture desirable physical properties, for instance, to render it a liquid rather than a solid, for convenience.

The three types or classes of compounds employed to give the present combination are the following:

(1) Certain oxyalkylated thermoplastic phenol-aldehyde resins, hereinafter described.

(2) Certain acylated amino-ethers, hereinafter described.

(3) Certain blown fatty bodies, hereinafter described.

As to the aforementioned oxalkylated thermoplastic phenol-aldehyde resins, item (1) above, reference is made to two co-pending applications of Melvin De Groote and Bernhard Keiser, Serial Numbers 8,730 and 8,731, both filed February 16, 1948, both now abandoned. The first of these two applications describes, among other things, a process for breaking petroleum emulsions by use of certain oxyalkylated thermoplastic resins. The latter application is concerned with such oxyalkylated resins per se and with their use in various arts. These oxyalkylated thermoplastic phenol-aldehyde resins are described, in general terms, in the first of the said two applications as follows:

"We have found that if solvent-soluble resins are prepared from difunctional (direactive) phenols in which one of the reactive (o or p) positions of the phenol is substituted by a hydrocarbon radical having 4 to 8 carbon atoms; in the substantial absence of trifunctional phenols, and aldehydes having not over 8 carbon atoms, subsequent oxyalkylation, and especially oxyethylation, yields products of unusual value for demulsification purposes, provided that oxyalkylation is continued to the degree that hydrophile properties are imparted to the compound. By 'substantial absence of trifunctional phenols,' we mean that such materials may be present only in amounts so small that they do not interfere with the formation of a solvent-soluble resin product and, especially, of a hydrophile oxyalkylated derivative thereof. The actual amounts to be tolerated will, of course, vary with the nature of the other components of the system; but in general the proportion of trifunctional phenols which is tolerable in the conventional resinification procedures illustrated herein is quite small. In experiments following conventional procedure using an acid catalyst in which we have included trifunctional phenols in amounts from 3% to about 1% or somewhat less, based on the difunctional phenols, we have encountered difficulties in preparing oxyalkylated derivatives of the type useful in the practice of this invention."

Patent 2,499,370, De Groote and Keiser, granted March 7, 1950, described in detail the production of oxyalkylated thermoplastic phenol-aldehyde resins, and includes a large number of examples of such products, and reference is made to that patent for a description of suitable products and their preparation, and specifically to Examples 1a through 68a for examples of suitable thermoplastic phenol-aldehyde resins for use as intermediates, and to Examples 1b through 9b and the tables which appear in columns 51 through 54 for examples of suitable oxyalkylated thermoplastic phenol-aldehyde resins useful as one component of the compositions of the present invention.

As to the aforementioned acylated amino-ethers, item (2) above, the following details are relevant here.

The acylation reaction employed to produce the acylated amino-ether is conducted in such a manner as to introduce an acyl radical derived from a monocarboxy detergent-forming acid. Such acids are characterized by having at least 8 carbon atoms and not more than 32 carbon atoms, and are exemplified by fatty acids, naphthenic acids, abietic acids, or the like, or by simple modifications thereof which do not detract from the ability of the acid to combine with alkali to produce soap or soap-like materials. For instance, hydrogenated oleic acid, chlorinated naphthenic acid, or brominated abietic acid will form such detergent-like bodies with the same ease as the parent materials themselves. The oxidized acids obtained by blowing or oxidation of the acids or esters are satisfactory. Such acids have frequently been referred to collectively in the art as monocarboxy detergent-forming acids. Needless to say, the acylation need not be conducted by means of the acid itself, but may be conducted by means of any compound of the acid which contains the acyl radical; for instance, an ester, an amide, an anhydride, an acyl chloride, etc.

Common polyhydric alcohols include the glycols and glycerols. These polyhydric alcohols are characterized by the ease with which two or more molecules combine with the elimination of water to form polyglycols, polyglycerols, or the like. These latter compounds are sometimes referred to as ether alcohols, because the typical ether linkage, carbon-oxygen-carbon, appears at least once in such compounds. It is known that certain hydroxyamines, particularly alkanolamines containing alkanol radicals, enter into the same kind of reaction with the formation of a hydroxylated amino-ether. Possibly, the commonest example of an alkanolamine is an ethanolamine, particularly diethanolamine and triethanolamine. It may be well to point out that one ingredient or component of the compounds herein included, and useful as demulsifying agents, etc., is derived from basic compounds, i. e., compounds in which the basicity approximates that of the parent hydroxyamine. Such basic amines are characterized by the fact that there is no aryl group directly attached to an amino nitrogen group, unless there be present at least one another amino radical capable of contributing a basic quality. In other words, a hydrogen atom attached to an amino nitrogen atom may remain as such, or may be replaced by an alkyl radical, an alicyclic radical, or an aralkyl radical, or there may be present a hydroxy alkyl radical, a hydroxy alicyclic radical, or a hydroxy aralkyl radical directly attached to the amino nitrogen atom. Furthermore, such hydroxy hydrocarbon radicals may be acylated with lower alphatic acids containing at least two carbon atoms and not more than 7 carbon atoms. Such acids include acetic acid, butyric acid, heptoic acid, etc. In the event that an amino nitrogen atom appears in which an aryl radical is directly attached to said amino nitrogen atom, as in the case of phenyl diethanolamine, then the presence of such non-basic amino nitrogen atom must be ignored and the compound must contain at least one amino nitrogen atom of a basic character elsewhere in the molecule. Other similar aryl alkanolamines, such as diphenyl ethanolamine, naphthyldiethanolamine, phenyldipropanolamine, etc. may be used, subject to the above-mentioned provision.

In the following table of compounds, the letter T indicates an amino hydrogen atom, or any one of the substituents which have been suggested as satisfactory to replace an amino hydrogen atom. The following table is submitted purely by way of illustration and indicates only a small portion of the various materials which may be acylated with a detergent-forming monocarboxy acid to provide a component of the reagents with which the present application is concerned:

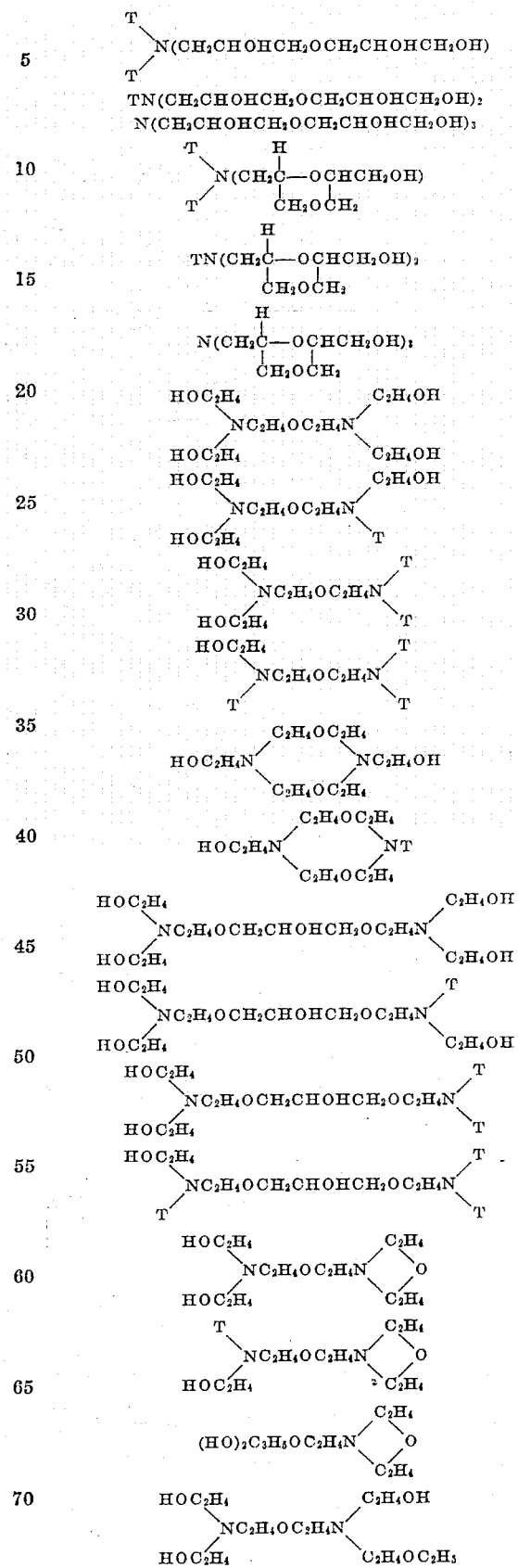

In the above table, it is understood that where the radical $C_2H_4$ occurs, it may be replaced by any other suitable radical, such as a C₃H₆, C₄H₈ radical, etc. Furthermore, it may be replaced by a residue from a cyclohexyl radical, or a residue from a benzyl radical or the like. Similarly, where the glycerol radical appears, a homolog may be substituted instead, as, for example, beta-methyl glycerol or the tetrahydroxyl derivative thereof. It is unnecessary to differentiate between isomeric forms; and in some instances, one may have polymeric forms containing a large number of residues derived from polyhydric alcohols or hydroxyamines, and of such a kind that there are present perhaps 20, 30, 40, or even 50 residues from the parent material or materials which contribute to the formation of the final molecule. Continuous etherization is considered as being polymerization, for purposes of convenience. Such polymers may be considered a repetition of the monomer, taken any convenient number of times—for instance, two to twenty times. It is also to be noted that the molecule may be joined by more than one ether linkage in parallel. As previously stated, phenyl diethanolamine or similar compounds may enter into the final molecule. Similarly, morpholine or ethanol morpholine may be employed. Morpholine may be considered as contributing the basic amino nitrogen atom. In each and every instance the compound is characterized by having present at least one basic nitrogen atom, i. e., a nitrogen atom unattached to any aryl radical and at least one hydroxylated hydrocarbon radical generally derived from an alkanolamine or from a glycerylamine, such as monoglycerylamine, diglycerylamine, or triglycerylamine.

As to the manufacture of such compounds, one need only point out that some of them are well known compositions of matter. Others can be produced, if desired, in the same manner employed to produce those which are well known. One method of producing such compounds is to heat the desired products under suitable conditions, so as to cause dehydration to take place. Another method is to treat the selected amine with a product such as an alkylene oxide, including ethylene oxide, or with a product such as glycidol. Other methods involving dehydration in persence of an acidic agent, for instance, dehydration of two moles of diethanolamine so as to produce the ether type compound instead of morpholine, may be employed. It is possible that some of the types indicated above, like other organic compounds, are difficult to prepare, but their derivatives can be prepared more readily. In other words, since an acylated product is desired, it is feasible, in some instances, to prepare the acylated product by uniting a partially esterified polyhydric alcohol with a partially esterified alkanolamine, or by use of an equivalent method. This particular method of producing the desired type of chemical compound will be discussed subsequently.

Patent 2,293,494, De Groote and Keiser, granted August 18, 1942, teaches a convenient method for making some of the intermediate compounds of this type, and reference is made to that patent for a description of a useful method for producing such compounds and to the example which appears in column 1 of page 5 for specific instructions as to preparing a suitable intermediate.

Having prepared a hydroxy amino-ether of the kind previously described, the second step in the manufacture of the present ingredient of my reagent is to acylate such a product so as to introduce an acyl radical derived from a detergent-forming mono-carboxy acid. For purposes of convenience, such mono-carboxy acid may be indicated by the formula R'.COOH and the acyl group by R'.CO. It has already been indicated that acylation may be conducted by use of the acid itself, or by use of any suitable compound containing the acyl radical in labile form.

Attention is directed to U. S. Patents Nos. 2,154,422 and 2,154,423, to De Groote, Keiser and Blair, both dated April 18, 1939. Both of said patents are concerned with products derived by esterification between intermediate amines containing an alcoholic hydroxy group and phthalic anhydride. It is necessary in the instances described in said patents that an alcoholic hydroxyl radical be present for reaction with phthalic anhydride. Insofar that the acylated amino-ethers herein included as components of my reagents need not be esterified with phthalic anhydride or the like, it is apparent that no alcoholic hydroxyl radical need be present, and that acyl radicals may be introduced so that there is no residual hydroxyl radical attached either to a hydrocarbon radical or to an acyl radical, such as a hydroxyl radical which is part of a ricinoleyl radical. Furthermore, it is apparent that even when acylation is accomplished with an acid having no hydroxyl radicals, for instance, stearic acid, oleic acid, naphthenic acid, or the like, then, in that event, one may acrylate a hydroxy amino-ether having only one free hydroxyl radical. A person skilled in the art will readily understand how to employ the methods and compounds described in said two aforementioned patents to prepare acylated derivatives from hydroxy amino-ethers of the kind above described and the selected detergent-forming monocarboxy acid compound.

Said patents indicate the following amines which may be employed: Diethanolamine, monoethanolamine, ethyl ethanolamine, methyl ethanolamine, propanolamine, dipropanolamine, propyl propanolamine; cyclohexanolamine, dicyclohexanolamine, cyclohexylethanolamine; cyclohexylpropanolamine, benzyl ethanolamine, benzyl propanolamine, pentanolamine, hexanolamine, octyl ethanolamine, octadecyl ethanolamine, cyclohexanol ethanolamine; triethanolamine, diethanolalkylamines, such as diethanolethylamine, diethanol propylamine; diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, mono-, di-, and triglycerylamine, etc.

Attention is also directed to the two aforementioned patents to the extent that they disclose and describe various glycerylamines and the method of manufacturing the same. Such methods obviously are applicable to derivatives of the kind previously mentioned, such as beta methyl glycerol, beta propyl glycerol, beta ethyl glycerol, etc., as well as derivatives of the tetrahydroxyl compounds obtainable therefrom.

It has been previously pointed out that this type of component of the present chemical compounds need not necessarily be manufactured by first preparing the hydroxy amino-ether, and subsequently acylating the same. As a matter of fact, in many instances it is more convenient to acylate the desired polyhydric alcohol or the desired hydroxy amine, and then combine the two acylated molecules or acylate one type of compound and combine with the unacylated molecule of the other type. Indeed, an examination of what has been said previously and an examination of the method suggested hereinafter indicates that one can proceed to produce a compound in which the acylated radical derived from the detergent-forming radical is produced at whatever point is desired. In other words, it may be introduced only in one or more hydroxy amino residues which are present; or the acyl radical may be introduced only in one or more polyhydric alcohol residues which are present; or it may be introduced both into the hydroxyamine residues which are present and into the polyhydric alcohol residue which is present. As previously pointed out, if desired, the acyl radical may be introduced more than once into the same hydroxyamino residue, or into the polyhydric alcohol residue, provided there are available sufficient alcoholic hydroxyls for such combination.

Acylation, of course, is identical with esterification for the purposes of the present description. In other words, instead of replacing the hydrogen atom of a hydroxyl group by an acyl radical, one can assume that the complete hydroxyl radical has been replaced by an oxyacyl radical, i. e., a fatty acid radical; and thus, the product may be referred to as esterified. Using such nomenclature, one can refer to an alkanolamine as being partially esterified with a selected detergent-forming monocarboxy acid or a polyhydric alcohol as being partially esterified. The manufacture of partially esterified alcohols, such as superglycerinated fats, is well known; and such compounds have considerable utility in the arts. Needless to say, the same method employed for producing superglycerinated fats may be employed in connection with any polyhydric alcohol and may be employed in connection with other acids instead of fatty acids, for instance, the other non-fatty detergent-forming monocarboxy acids; such as abietic acid, naphthenic acid, and the like. In view of this fact, no description is necessary as to the method of preparing partially esterified polyhydric alcohols from detergent-forming acids of the kind described. Furthermore, no description is necessary as to the method of preparing partially esterified alkanolamines, in view of what has been said previously, and particularly in view of the complete description of equivalent acylation procedure, which appears in the aforementioned United States Patents Nos. 2,154,422 and 2,154,423.

Patent 2,228,989, De Groote, Keiser and Blair, describes products obtained by heating a partially esterified tertiary alkanolamine with a polyhydric alcohol to produce ethereal reaction products useful as components of the compositions of the present invention, and reference is made to that patent and to Examples 1, 2 and 3 thereof for specific examples of useful products.

Patent 2,228,987, De Groote, Keiser and Blair, describes products obtained by heating a triglyceride, a tertiary alkanolamine and a polyhydric alcohol to produce products useful as components of the compositions of this invention and reference is made to that patent and to Examples 1 through 5 thereof for a description of such products and illustrative examples.

Patent 2,228,988, De Groote, Keiser and Blair, describes products obtained by heating a partially esterified tertiary alkanolamine with a tertiary-alkanol amine to produce products which are useful as components of the compositions of this invention and reference is made to that patent and to Examples 1 through 3 thereof for a description of these products and specific illustrations thereof.

It is to be noted that reference is made to the above cited patents in regard to a further elaboration as to various fatty acid esters, i. e., ordinary vegetable oils, fats, and the like, which may be employed, and also as to further description of acceptable hydroxyamines and polyhydric alcohols which may be employed. It must be recognized that the materials have not lost their basicity to any great degree, as compared with the hydroxyamines from which they were orginally derived. Esterification or acylation may tend to reduce the basicity to some degree, although, in some instances, it may even be increased. Such moderate changes are immaterial. The products previously described combine with water to form a base, presumably a substituted ammonium compound. Where more than one amino nitrogen atom is present, they act as a polyamine. Such compounds may combine with acetic acid, hydrochloric acid, lactic acid, nitric acid, butyric acid, phosphoric acid, oxalic acid, or any suitable organic or inorganic acid, to form salts. It is understood that references in the specification and appended claims of the present application to amines, include the basic form and the acid salts, as well as the amines themselves.

Generally speaking, it is my preference to obtain the products from amines in which there is no hydrogen atom attached to the amino nitrogen atom. In orther words, my preference is to use tertiary amines, such as ethyl diethanolamine, diethyl ethanolamine, triethanolamine, etc. Generally speaking, it is my preference to prepare the products from the tertiary amines, in which there is an alkanolamine radical present, particularly an ethanolamine radical present. Furthermore, it is my preference to employ derivatives of glycerol in forming the ether type compound. Particular attention is directed to the types of compounds as prepared according to the directions in the patents previously referred to. Incidentally, I desire to point out that T, previously referred to, may represent an RCO radical directly attached to the amino nitrogen radical. In other words, the product may also be an amide. The RCO is such instances may be derived from an acid having less than 8 carbon atoms, or from a detergent-forming acid. However, in such instances the basicity of the amino radical will usually disappear in conversion into an amide; and therefore, in such instances it is usually necessary to have another amino nitrogen atom present which supplies the basicity of the molecule. Such situation is entirely analogous to the presence of an amino nitrogen atom attached to an aryl radical, as in the case of phenyl diethanolamine, previously referred to. There is no objection to any non-basic nitrogen atom contributing part of the molecular weight in the form of an arylamine radical, or in the form of an amido radical, provided that the compound still is basic, due to the presence of some other basic amino nitrogen radical of the kind previously described.

Attention is again directed to the fact that, although the examples of the patents just referred to are concerned largely with derivatives of unmodified fatty acids, yet the same procedure is also applicable to modified fatty acid compounds manufactured in the manner previously indicated, to wit, so that such modifications are still convertible into soap or soap-like bodies by agency of suitable alkalies. Similarly, one can prepare compounds of abietic acid, naphthenic acid, or modified forms thereof. It is not necessary to prepare the acylated amino-ethers from esters; but if such procedure is desired, then one can first prepare esters from naphthenic acid, abietic acid, or the like, which correspond to naturally-occurring esters; for instance, one can prepare naphthenin, abietin, or the like. I particularly prefer to prepare compounds characterized by the presence of at least one, and preferably more than one, hydroxy hydrocarbon group in the final product. Reference is made to the fact that the table appearing in the early part of this application, describing a series of representative hydroxy amino-ethers, contains certain species in which the ether linkage involved combination with a monohydric alcohol. Such alcohols can vary from methyl thru octadecyl, or stearyl, and may be normal or branched. In view of this fact, it must be appreciated that the scope of the compounds contemplated as ingredients of the demulsifying agents in the present application may be derived from hydroxy amines and monohydric alchols, as well as hydroxy amines and dihydric alchols, or from intermolecular reactions of two or more moles of hydroxy amines. As to the manufacture of such alkyl ethers or hydroxy alkylamines, it is to be noted that they can be manufactured by means of conventional methods now employed, or by methods which involve modification of previously described methods; or they may be manufactured by the method described in French Patent No. 832,288, dated September 23, 1938, to Zschimmer and Schwarz, Chemische Fabrik Dölau.

Having obtained such alkyl ethers of hydroxy alkylamines by the method suggested in said aforementioned French Patent No. 832,288, or by any other means, one then acylates such products in the same manner previously described. As has been pointed out previously, my preference is to use fatty acids, particularly the fatty acid compounds, such as esters, because they are readily available in the form of naturally-occurring oils and fats. Among the various desirable glycerides are: castor oil, olive oil, cottonseed oil, rapeseed oil, fish oil, menhaden oil, corn oil, cocoanut oil, palm oil, palm kernel oil, linseed oil, sunflower-seed oil, teaseed oil, neat's-foot oil, etc. My preference is that the monomeric chemical compound, exclusive of acyl radicals, shall contain less than 60 carbon atoms, and in most instances, shall contain less than 25 carbon atoms. The acylated amino-ethers used in this invention are ether mono- or polyamino bodies, i. e., they contain one or more amino nitrogen atoms. In all preferred cases, they do not contain more than five such nitrogen atoms, and most preferably, they contain two or three such nitrogen atoms.

As to the aforementioned blown fatty bodies, item (3) above, the following is offered, by way of amplification and characterization.

Blown fatty oils, and particularly blown castor oil, have long been known and have been used in various arts, including the demulsification of petroleum oils. In general, they are produced by the action on a fatty oil or fatty acid of an oxygen-containing gas, commonly air, and usually at somewhat elevated temperatures. In characteristics, they range from relatively low viscosity, light colored liquids to nearly black liquids whose consistency may best be defined as semi-livery. I prefer to use blown castor oil as the preferred ingredient of this type in my reagent.

It has long been known that various animal, vegetable, and marine oils can be blown or oxidized, so as to yield materials which differ in chemical and physical properties and characteristics from the parent materials from which they are derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C., or 130° C., or may be conducted at a much higher temperature. Oxidation may be conducted in absence of catalysts, or in presence of catalysts. Such catalysts may consist of metallic salts, such as cobalt or manganese oleate, or may consist of organic material, such as alpha pinene or the like. Oxidation may be conducted in a relatively short time, such as 20 hours, or may require 200 hours or more.

Patents which describe conventional blown oils or conventional methods of making various blown oils for various purposes (including in some instances, for the purpose of demulsifying crude oils), include the following:

U. S. Patent No. 1,929,399, dated October 3, 1933, to Fuchs; U. S. Patent No. 1,969,387, dated August 7, 1934, to Tumbler; U. S. Patent No. 2,023,979, dated December 10, 1935, to Stehr; U. S. Patent No. 2,041,729, dated May 26, 1936, to Seymour; and U. S. Patent No. 1,984,633, dated December 18, 1934, to De Groote and Keiser.

Inasmuch as the material of this class which I prefer to use as a component of the finished compositions of my invention is derived from blown castor oil, an effort will be made to describe said material or compound in considerable detail. Mild oxidation of castor oil (see "Chemical Technology and Analysis of Oils, Fats and Waxes," by Lewkowitsch, 6th edition, vol. 2, p. 406) produces relatively small modifications in certain important chemical indices, such as the iodine value, the acetyl value, and the saponification value. If drastic oxidation takes place, either by continued mild oxidation from the very beginning of the reaction, or as induced by either a higher temperature of reaction, or by the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; an acetyl value of approximately 160 to 200; an increased viscosity; a specific gravity of almost 1, or even a trifle over 1 at times; and in absence of other coloring matter, a deep orange to deep brown color.

Drastically oxidized castor oil can be prepared by well known methods, or such products can be purchased on the open market under various trade names, such as "blown castor oil," "bodied castor oil," "blended castor oil," "blended bodied castor oil," "processed castor oil," "oxidized castor oil," "heavy castor oil," "viscous castor oil," etc. These various names appear to be applied to drastically oxidized castor oils which are different in degree but not different in kind.

In preparing the present reagent, not only may blown oils be derived by direct oxidation of the various fats and oils, but also by direct oxidation of the fatty acids. Blown ricinoleic acid may be derived in the manner indicated in U. S. Patent No. 2,034,941, dated March 24, 1936, to De Groote, Keiser and Wirtel. It should be noted that blown oils in the broad generic sense herein employed include not only the products derived by oxidation, but also the products derived by polymerization. Reference is made to polymerized ricinoleic acid described in U. S. Patent No. 1,901,163, dated March 1, 1933, to Hinrichs. Reference is also made to polymerized castor oil or similar oils of the kind disclosed in U. S. Patent No. 2,114,651. It might also be desirable to point out that the expression "blown oil," as herein used, includes blown unsaturated liquid waxes, such as blown sperm oil. It is understood that in the appended claims the expression "blown fatty body" is used in its broad sense to include all the various materials, such as esterified blown fatty acids.

In such instances where blown or polymerized acids are used, in preparing the acylated amino-ethers above referred to, it will become apparent that these materials must be converted into an ester before reaction with an amine, as subsequently described. For instance, blown castor oil fatty acids, or polymerized ricinoleic acid can be converted into the ethyl ester, methyl ester, propyl ester, cyclohexyl ester, ethylene glycol ester, glyceryl ester, or any suitable ester by means of conventional esterification processes.

A drastically oxidized castor oil of the above kind may, for example, have approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent $SO_3$ | 0.0 |
| Percent ash | Trace |

Another variety of drastically oxidized castor oil which I prefer to use shows the following characteristics:

| | |
|---|---|
| Acid number | 6.3 to 8.7 |
| Saponification number | 202.5 to 223.0 |
| Iodine number | 60.8 to 63.0 |
| Acetyl number | 105.3 to 108.4 |
| Hydroxyl number | 114.4 to 118.0 |
| Percent unsaponifiable matter | 1.0 to 1.2 |
| Percent nitrogen | 0.0 |
| Percent $SO_3$ | 0.0 |
| Percent ash | 0.0 |

It is my preference to use blown oils, rather than blown fatty acids. I particularly prefer to use blown vegetable oils, such as blown cottonseed oil, blown corn oil, blown soyabean oil, blown rapeseed oil, and especially blown castor oil. My preferred blown oil is a blown castor oil, which has been blown somewhat more drastically than indicated by the indices above recited, and which has been blown just short of the stage which produces semi-livery oils, as described in the aforementioned Stehr Patent No. 2,023,979.

Said Stehr patent discloses blown oils which are produced by prolonged or more drastic oxidation than is employed in the production of ordinary blown oils. The patentee refers to his products as "super-oxidized blown oils," and states that in order to distinguish them from ordinary blown oils, which are free from gumminess or gelatinization, he refers to them as "semi-livery blown oils." Such blown oils are useful in the present instance.

It should be understood that "semi-livery" refers to such blown oils as freshly prepared, because any oil capable of being oxidized or polymerized may ultimately become semi-livery or even solid in some instances.

Blowing or oxidation should be continued to a point where the product is just short of kerosene-insoluble, to produce products of the Stehr type. That specification defines these blown oils as being oxidized beyond ordinary conventionally blown oils, but not oxidized quite so far as to be kerosene-insoluble. At this point, these oils possess the gummy, semi-livery physical characteristics referred to.

In producing the product of the present invention, I may include blown oils of the Stehr type, that is, oils produced or derived by the super-oxidation of a fatty body in which oxidation has been continued until the super-oxidized mass is semi-livery in consistency when freshly prepared, and which is further characterized by the fact that oxidation has been carried to a point just short of the point where the blown oil is kerosene-insoluble.

As previously stated, I prefer to employ castor oil as the fatty body which is blown or oxidized; and I prefer to blow or oxidize such castor oil just short of the level of the Stehr blown products as described above.

To produce my reagent, the three ingredients above described, viz., the oxyalkylated derivative of a phenol-aldehyde resin, the acylated product of a hydroxy amino-ether, and the blown fatty body, all obtained as above stated, are mixed together. I have found that different proportions of these three kinds of ingredients in the mixture are required to be used to obtain optimum results, on different petroleum emulsions, for example. However, I do not claim any ternary mixture of oxyalkylated derivatives of phenol-aldehyde resins, acylated amino-ethers, and blown fatty bodies. In all cases, considering the active matter of the reagent as 100%, there must be present at least 10% of each of the three active ingredients, which means that in no case can there be more than 80% of any single ingredient in such active matter.

The actual manufacture of the reagents herein included consists simply in making a ternary mixture of the three components or ingredients comprising my reagent. Any suitable mixing device may be employed. Usually it is convenient to dilute the reagent with a solvent of the kind hereinafter described. It is sometimes convenient to dilute any one or each of the ingredients with a predetermined amount of a selected solvent and to permit such solvent to remain as part of the final finished reagent.

In view of the extensive description of the respective ingredients given above, it does not appear necessary to add anything further as to their manufacture. However, purely for purposes of illustration, the following example of a preferred form of my reagent is given.

The oxyalkylated derivative of a phenol-aldehyde resin which I prefer to use as one ingredient of my reagent is that described under Example 5b of Patent 2,499,370, prepared from the resin of Example 3a of Patent 2,499,370.

The acylated amino-ether I prefer to employ as the second ingredient of my reagent is prepared as follows: I prepare a mixture of diamino and triamino materials which respectively correspond essentially to the two following type formulas:

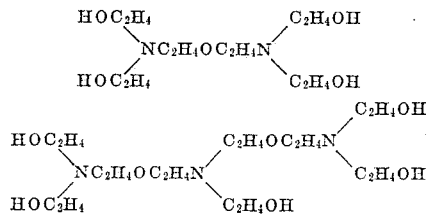

After determining the average molecular weight of such mixture, I combine the same with castor oil in the following proportion: 1 pound mole of castor oil for 3 pound moles of the mixed amines, "pound mole" in the latter case being calculated on the average molecular weight as determined. Such mixture is heated to approximately 160–260° for approximately 6 to 25 hours, until reaction is complete, as indicated by the disappearance of all of the triricinolein present in the castor oil.

The blown fatty body I prefer to employ as the third ingredient of my reagent is of the drastically oxidized type, similar to that described in U. S. Patent No. 2,023,979, to C. N. Stehr. As stated above, I prefer to use blown castor oil, which has been blown somewhat more drastically than the products indicated by the foregoing indices, and which has been blown with air to a consistency just short of the stage which produces semi-livery oils, as described in said Stehr patent.

As a specific example of my reagent, I give the following: oxyethylated derivative of para tertiary amyl phenol-formaldehyde resin, prepared as in Example 5b of Patent 2,499,370, 33 parts; acylated amino-ether, prepared from castor oil and polymerized triethanolamine, as described above, 33 parts; blown castor oil of the drastically oxidized type, as described above, 34 parts. Add to the above mixture of active ingredients a total of 100 parts of aromatic petroleum solvent, and mix thoroughly. (It is usually easier to add the oxyalkylated resin ingredient in the form of a 50% solution in such aromatic solvent. In such case, 66 parts of such diluted ingredient should be employed, and the final solvent addition should be 67 parts, instead of 100.)

In a second specific example of my reagent, I employ 40 parts of oxyethylated derivative of para tertiary butyl phenol-formaldehyde resin, prepared as in Example 1b of Patent 2,499,370; 30 parts of acylated amino-ether, prepared from tall oil and polymerized triethanolamine; and 30 parts of blown rapeseed oil of the drastically oxidized type. To the above mixture of active ingredients, I add 60 parts of aromatic petroleum distillate, 40 parts of stove oil, and 10 parts of secondary butyl alcohol, and mix thoroughly. A portion of the respective solvents may be added to the separate active ingredients if desired; and the so diluted active ingredients may be mixed in such amounts as to give the foregoing proportions.

In a third specific example of my reagent, I employ 50 parts of oxyethylated derivative of octyl phenol-formaldehyde resin, prepared as in Example 6b of Patent 2,499,370; 30 parts of acylated amino-ether, prepared from soybean oil and polymerized triethanolamine; and 20 parts of blown castor oil of the drastically oxidized type. To this mixture of active ingredients, I add 50 parts of aromatic petroleum distillate, 30 parts of stove oil, and 20 parts of isopropyl alcohol. As before, such added solvents may be incorporated in the respective active ingredients before the latter are mixed to produce my reagent.

The three examples of my reagent just recited are exemplary only, and are intended to illustrate the various reagents which it is possible to prepare simply by varying the proportions of the several types of active ingredients and by varying the compositions of such types of ingredients by substitution of various oils in their preparation.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, antharcene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the present reagents, when employed as demulsifying agents, may be admixed with one or more of the solvents customarily used in connection with conventional demulsifying agents. It has been previously pointed out above that it is sometimes convenient to add a selected solvent, in predetermined amount, to any one or to each of the ingredients which are to be combined to form the ternary mixture which constitutes the active matter in the present reagents.

The mixture of preferred ingredients is stirred until uniform throughout. In some instances, it is desirable to dilute the product still further; and my preference in such instances is to use a petroleum distillate in such amount that the finished product will contain approximately 25% of such solvent by volume.

I have repeatedly demonstrated the effectiveness of my proposed reagent as a demulsifier for crude petroleum oil. It appears to be effective for this purpose when applied to emulsions produced in widely separated oil fields, and to reduce the impurities in the crude oil to pipeline requirements, when used in quite small proportions, as compared with the volume of emulsion to be treated.

Reagents prepared from my three classes of ingredients may be expected to vary in solubility from water-soluble to oil-soluble, or they may even exhibit relatively limited solubility in either water or oil. The oxyalkylated resin derivatives and the acylated amino-ether materials are in general more hydrophile in nature; while the blown fatty materials are usually distinctly not hydrophile in nature. My preferred form of reagent is not markedly water-soluble. Some forms are of relatively limited oil-solubility. However, since such reagents are sometimes used in proportions of 1 to 10,000 or 1 to 20,000 or even 1 to 30,000, or less, such apparent insolubility in oil and water is not significant, because said reagents undoubtedly have solubility within the concentration range employed.

The superiority of my reagent when used as a demulsifying agent is based upon its ability to treat certain emulsions more advantageously or at lower cost than is possible with other available demulsifiers or conventional mixtures thereof. My reagent may find relatively limited application as far as the majority of oil field emulsions is concerned; but I have found that such a reagent has commercial value as it will economically break or resolves oil field emulsions in a number of cases which cannot be treated as easily or at as low cost with the demulsifying agents heretofore available.

When my reagents are used for resolving petroleum emulsions, they are brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

My reagent may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

As previously stated, the above mixture is of distinct value in treating emulsions of the water-in-oil type, particularly petroleum emulsions. However, such mixture is also of value for other purposes. I have found that the mixture above described is of distinct value as a break inducer in doctor treatment of the kind indicated to sweeten gasoline (see U. S. Patent No. 2,157,223, dated May 9, 1939 to Sutton). I have also found that the above product has use as an emulsifying agent in preparing cresylic acid or similar emulsions for various purposes, such as are used for cattle dip or the like.

Reagents of the kind herein included are useful as wetting, detergent, and leveling agents in the laundry, textile, and dyeing industries; as wetting agents and detergents in the acid washing of fruits; in the acid washing of building stone and brick; as a wetting agent and spreader in the application of asphalt in road building and the like; as a constituent of soldering flux preparations; as a flotation reagent in the flocculation separation of various minerals; for flocculation and coagulation separation of various minerals; for flocculation and coagulation of various aqueous suspensions containing negatively charged particles such as sewage, coal washing waste water, and various trade wastes, and the like; as germicides, insecticides, emulsifiers for cosmetics, spray oils, water repellent textile finish, etc. These uses are by no means exhaustive.

Particular mention is made in respect to the use of these products in the removal of mud sheaths as described in U.S. Patent No. 2,135,909 dated November 8, 1938, to Monson.

In the hereto attached claims, reference to the number of carbon atoms in the amino-ether radical means the radical as such, without reference to any attached acyl or oxy-acyl radicals.

Having thus described my invention, what I claim as new and desire to secure by Letters Patent is:

1. A mixture comprising: (A) hydrophile synthetic oxyalkylated derivatives prepared from (a) an alpha-beta alkylene oxide having not more than 4 carbon atoms and selected from the class consisting of ethylene oxide, propylene oxide, butylene oxide, glycide, and methylglycide; and (b) an oxyalkylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

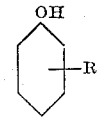

in which R is a hydrocarbon radical having at least 4 and not more than 8 carbon atoms and substituted in the 2,4,6 position; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with from one to three volumes of water; (B) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyamino-ether radical being characterized by containing not over 60 carbon atoms; and (b) an acyl radical derived from a detergent-forming monocarboxy acid having at least 8 carbon atoms and not more than 32 carbon atoms; said acylated amino-ether being additionally characterized by the fact that said aforementioned acyl radical is a substituent for a hydrogen atom of an alcoholic hydroxyl radical; (C) a blown fatty body selected from the class consisting of blown fatty oils and blown fatty acids; the proportions of A, B, and C, respectively, constituting not less than 10% each of the total active matter of said reagent.

2. The mixture of claim 1, wherein the alkylene oxide employed is ethylene oxide, and wherein the divalent radicals introduced by the use of said ethylene oxide have the formula $(C_2H_4O)_n$.

3. The mixture of claim 1, wherein the alkylene oxide employed is ethylene oxide, and wherein the divalent radicals introduced by the use of said ethylene oxide have the formula $(C_2H_4O)_n$; and wherein the phenol-aldehyde resin referred to in section (A) of said claim is a low-stage resin having an average molecular weight corresponding to at least 3 and not over 7 phenolic nuclei per resin molecule, the substituent R is an aliphatic hydrocarbon radical, and the aldehyde is formaldehyde.

4. The mixture of claim 1, wherein the alkylene oxide employed is ethylene oxide, and wherein the divalent radicals introduced by the use of said ethylene oxide have the formula $(C_2H_4O)_n$; and wherein the phenol-aldehyde resin referred to in section (A) of said claim is an acid-catalyzed low-stage resin having an average molecular weight corresponding to at least 3 and not over 7 phenolic nuclei per resin molecule, the substituent R is an aliphatic hydrocarbon radical substituted in the para position, and the aldehyde is formaldehyde.

5. The mixture of claim 1, wherein the alkylene oxide employed is ethylene oxide, and wherein the divalent radicals introduced by the use of said ethylene oxide have the formula $(C_2H_4O)_n$; and wherein the phenol-aldehyde resin referred to in section (A) of said claim is an acid-catalyzed low-stage resin having an average molecular weight corresponding to at least 3 and not over 7 phenolic nuclei per resin molecule, the substituent R is a butyl radical substituted in the para position, and the aldehyde is formaldehyde.

6. The mixture of claim 1, wherein the alkylene oxide employed is ethylene oxide, and wherein the divalent radicals introduced by the use of said ethylene oxide have the formula $(C_2H_4O)_n$; and wherein the phenol-aldehyde resin referred to in section (A) of said claim is an acid-catalyzed low-stage resin having an average molecular weight corresponding to at least 3 and not over 7 phenolic nuclei per resin molecule, the substituent R is an amyl radical substituted in the para position, and the aldehyde is formaldehyde.

7. The mixture of claim 1, wherein the alkylene oxide employed is ethylene oxide, and wherein the divalent radicals introduced by the use of said ethylene oxide have the formula $(C_2H_4O)_n$; and wherein the phenol-aldehyde resin referred to in section (A) of said claim is an acid-catalyzed low-stage resin having an average molecular weight corresponding to at least 3 and not over 7 phenolic nuclei per resin molecule, the substituent R is an octyl radical substituted in the para position, and the aldehyde is formaldehyde.

LOUIS T. MONSON.

REFERENCES CITED

The following references are of record in the file of this patent:

UNITED STATES PATENTS

| Number | Name | Date |
|---|---|---|
| 2,246,856 | Monson et al. | June 24, 1941 |
| 2,454,541 | Bock et al. | Nov. 23, 1948 |